United States Patent
Cheng

(10) Patent No.: US 11,909,709 B1
(45) Date of Patent: Feb. 20, 2024

(54) IDENTIFYING SERIALLY-CONNECTED POWER OVER ETHERNET (POE) NETWORKED DEVICES

(71) Applicant: FLYTECH TECHNOLOGY CO., LTD., Taipei (TW)

(72) Inventor: Hsiang-Yi Cheng, Taipei (TW)

(73) Assignee: FLYTECH TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 18/078,175

(22) Filed: Dec. 9, 2022

(30) Foreign Application Priority Data

Oct. 24, 2022  (TW) .................................. 111140311

(51) Int. Cl.
*H04L 61/103*  (2022.01)
*H04L 41/0213*  (2022.01)
*H04L 41/12*  (2022.01)

(52) U.S. Cl.
CPC ........ *H04L 61/103* (2013.01); *H04L 41/0213* (2013.01); *H04L 41/12* (2013.01)

(58) Field of Classification Search
CPC ....... H04L 41/12; H04L 41/122; H04L 41/34; H04L 41/342; H04L 41/344; H04L 41/40; H04L 41/0213; H04L 61/103
USPC ....................................................... 709/245
See application file for complete search history.

(56) References Cited

U.S. PATENT DOCUMENTS

| | | | | |
|---|---|---|---|---|
| 2006/0072531 A1* | 4/2006 | Ewing | ..................... | H04L 69/08 455/445 |
| 2014/0198208 A1* | 7/2014 | Neufeld | .................. | G06F 3/005 348/143 |
| 2018/0332235 A1* | 11/2018 | Glaser | .................... | H04N 23/58 |

* cited by examiner

*Primary Examiner* — Hee Soo Kim
(74) *Attorney, Agent, or Firm* — Jackson IPG PLLC; Demian K. Jackson

(57) ABSTRACT

The present invention relates to a networked device configuration identifying method. The method includes switching on a plurality of communication ports on a power sourcing device; executing a smart address resolution protocol to acquire an initial all device address information including a plurality of addresses for a plurality of powered devices connected to the plurality of communication ports; switching off an interested communication port out of from the plurality of communication ports; executing the smart address resolution protocol through the plurality of communication ports to acquire a background device address information including at least one background address for at least one background powered device connected to the plurality of communication ports except the interested communication port; and comparing the initial all device address information and the background device address information to acquire at least one interested address for at least one interested powered device connected to the interested communication port.

10 Claims, 6 Drawing Sheets

| 20 | 30 | |
|---|---|---|
| Internet Address | Physical Address | Type |
| 10.10.50.7 | ec-eb-b8-1e-bb-e3 | dynamic |
| 10.10.50.10 | 00-15-5d-c8-fa-2a | dynamic |
| 10.10.50.29 | 24-5e-be-27-4a-76 | dynamic |
| 10.10.50.109 | 4c-44-5b-c9-a9-1e | dynamic |
| 10.10.50.111 | 00-00-00-00-00-01 | dynamic |
| 10.10.50.130 | d8-5e-d3-40-3d-9e | dynamic |
| 10.10.50.139 | 00-e0-4c-68-02-81 | dynamic |

FIG. 2

| 20 | 30 | |
|---|---|---|
| Internet Address | Physical Address | Type |
| 10.10.50.7 | ec-eb-b8-1e-bb-e3 | dynamic |
| 10.10.50.10 | 00-15-5d-c8-fa-2a | dynamic |
| 10.10.50.29 | 24-5e-be-27-4a-76 | dynamic |
| 10.10.50.109 | 4c-44-5b-c9-a9-1e | dynamic |

FIG. 3

| 20 | 30 | |
|---|---|---|
| Internet Address | Physical Address | Type |
| 10.10.50.111 | 00-00-00-00-00-01 | dynamic |
| 10.10.50.130 | d8-5e-d3-40-3d-9e | dynamic |
| 10.10.50.139 | 00-e0-4c-68-02-81 | dynamic |

FIG. 4

```
$ snmpwalk -v 2c -c public  10.10.50.111  .1.3.6.1.2.1.1.3.0
Iso.3.6.1.2.1.1.3.0  = Timeticks: (6805)  0:01:08.05

$ snmpwalk -v 2c -c public  10.10.50.130  .1.3.6.1.2.1.1.3.0
Iso.3.6.1.2.1.1.3.0  = Timeticks: (8296)  0:01:22.96

$ snmpwalk -v 2c -c public  10.10.50.139  .1.3.6.1.2.1.1.3.0
Iso.3.6.1.2.1.1.3.0  = Timeticks: (9250)  0:01:32.50
```

IDENTIFYING SERIALLY-CONNECTED POWER OVER ETHERNET (POE) NETWORKED DEVICES

CROSS-REFERENCE TO RELATED APPLICATION

This application claims priority benefit to Taiwan Invention Patent Application Serial No. 111140311, filed on Oct. 24, 2022, in Taiwan Intellectual Property Office, the entire disclosures of which are incorporated by reference herein.

FIELD

The present invention relates to a networked device configuration identifying method and device, in particular to a networked device configuration identifying method and device applied to the technology of power over Ethernet.

BACKGROUND

In the state of the art, a power over Ethernet (PoE) technology is frequently used for establishing a local area network (LAN). The PoE technology integrates the electric power and network transmission by using Ethernet transmission lines for providing both the network connection and the power supply at the same time. When a device using Ethernet is connected to the Ethernet transmission line, it receives the electric power supply provided by the PoE device for Ethernet at the same time, such that it has no need to connected to an external electric power source. The PoE technology in the art is commonly used in security and surveillance systems, to provide the electric power and network connection between the system host and multiple IP cameras, for example.

In general, a single communication port on a PoE device is capable of connecting with multiple networked devices by establishing a serial connection. The serial connection saves the use and cost of adapters and power lines. However, when the PoE device has been used for a period of time, the single communication port is connected with many devices in series. As time goes on, it becomes so difficult for a network administrator to count the numbers of networked devices that are actually connected to all the respective communication ports on the PoE device, and identify the MAC addresses and IP addresses for the respective networked devices that are serially connected to each communication ports. Once a device on the LAN failed, the network administrator has hardly found out the failing networked device and the specific communication port to which it is connected in a short time.

For instance, for a security and surveillance system, in order to save the setup cost as much as possible, each communication ports on the PoE device are connected with different numbers of IP cameras in series, which the numbers of IP cameras are up to 5 or even more in some cases. When any one among these IP cameras fails to work, due to the serial connection, the network administrator is hard to quickly and correctly discover the particular failing networked device and the specific communication port to which it is connected as well as its accurate position in the serial connection.

In terms of the current art, since the configurations of the serial connections for the multiple networked devices that are connected to the respective communication ports fails to know, the only way the administrator can conduct to find out the particular failing camera is a manual troubleshooting operation, by manually turning on and off each of the communication ports and each cameras repeatedly, or turning on and off the power source of the PoE device repeatedly. Then, after time-consuming repeated manual try-and-error tests, the particular failing camera is identified.

Therefore, although the current PoE art and the serial connection thereof indeed cut the hardware cost down effectively, it increases the difficulty and expanses for the future maintenance on the contrary. Moreover, in the conventional PoE art, there is further a deficiency that the addresses and the configurations of the serial connections for the multiple networked devices connected to each communication ports are not identified.

Hence, there is a need to solve the above deficiencies/issues.

SUMMARY

The present invention relates to a networked device configuration identifying method and device, in particular to a networked device configuration identifying method and device applied to the technology of power over Ethernet.

Accordingly, the present invention provides a networked device configuration identifying method. The method includes steps of switching on a plurality of communication ports on a power sourcing device; executing a smart address resolution protocol to acquire an initial all device address information including a plurality of addresses for a plurality of powered devices connected to the plurality of communication ports; switching off an interested communication port out of from the plurality of communication ports; executing the smart address resolution protocol through the plurality of communication ports to acquire a background device address information including at least one background address for at least one background powered device connected to the plurality of communication ports except the interested communication port; and comparing the initial all device address information and the background device address information to acquire at least one interested address for at least one interested powered device connected to the interested communication port.

Preferably, the networked device configuration identifying method further includes one of: switching on the interested communication port; executing a smart network management protocol to acquire a first time tick for a first interested device connected to the interested communication port and a second time tick for a second interested device connected to the interested communication port; comparing values of the first time tick and the second time tick; determining that the first interested device is connected ahead of the second interested device in series to the interested communication port, when the first time tick is greater than the second time tick; and determining that the first interested device is connected behind the second interested device in series to the interested communication port, when the first time tick is less than the second time tick.

The present invention further provides a networked device configuration identifying device. The device includes a plurality of communication ports and a microcontroller, in which the microcontroller is configured to execute processes as follows: switching on a plurality of communication ports on a power sourcing device; executing a smart address resolution protocol to acquire an initial all device address information including a plurality of addresses for a plurality of powered devices connected to the plurality of communication ports; switching off an interested communication port out of from the plurality of communication ports; executing the smart address resolution protocol through the plurality of communication ports to acquire a background device address information including at least one background address for at least one background powered device connected to the plurality of communication ports except the interested communication port; and comparing the initial all device address information and the background device address information to acquire at least one interested address for at least one interested powered device connected to the interested communication port.

Preferably, the networked device configuration identifying device further includes one of: a switch component configured to switch on or off a communication and power transmission for at least one communication port out of from the plurality of communication ports; and the microcontroller configured to acquire a right of control to switch on or off the communication and power transmission for the plurality of communication ports by controlling the switch component.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein:

FIG. 2 is a schematic view demonstrating the initial all device address information obtained by implementing the networked device configuration identifying method according to the invention;

FIG. 3 is a schematic view demonstrating the background device address information obtained by implementing the networked device configuration identifying method according to the present invention;

FIG. 4 is a schematic view demonstrating the interested device address information obtained by implementing the networked device configuration identifying method according to the present invention;

DETAILED DESCRIPTION

Figure 1:
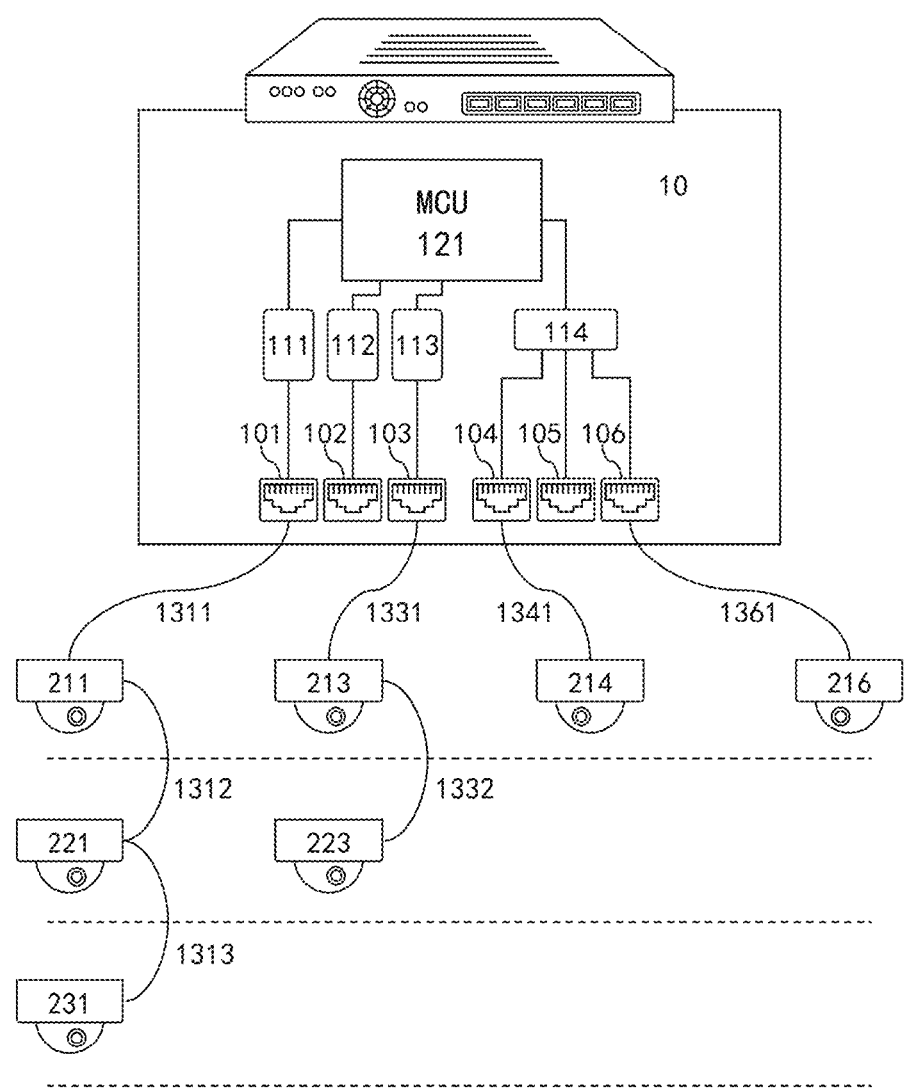
FIG. 1 is a block diagram illustrating the hardware architecture for the networked device configuration identifying device according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

FIG. 1 is a block diagram illustrating the hardware architecture for the networked device configuration identifying device according to the present invention. The networked device configuration identifying device 10 according to the present invention is a power over network device including a network equipment module and a power sourcing equipment (PSE) module, to provide a basic network connection and transmission function, and integrates the power supply function into the networking function. Through the network cables, it supplies electric power to a variety of networked devices connected in the network. In a local area network (LAN) organized by the power over network device as the center node and the connected networked devices, the networked devices act as powered devices (PD). The power over network device is also known as a PSE end or a network power supply end, as well as the networked devices are also known as a PD end or a network powered end.

In the present embodiment, the networked device configuration identifying device 10 is preferably a power over Ethernet (PoE) device including but not limited to: a PoE hub, a PoE switch, a PoE router, a PoE bridge, a PoE gateway, a PoE brouter, a PoE repeater or a PoE IP NAT. The networked devices are preferably different sorts of networked devices that support a power transmission over network function including but not limited to: IP cameras, notebook computers, VoIP telephones, network printers, network NAS, or Internet televisions.

In the present embodiment, the networked device configuration identifying device 10 is addressed by taking a PoE hub as an example. However, the implementation of the present invention is not limited to a PoE hub. In the present embodiment, the networked device configuration identifying device 10 at least includes a plurality of communication ports 101-106, multiple switch components 111-114 and a microtroller (MCU) 121 that are electrically connected with each other, wherein the communication port 101 is connected to a network powered device 211 within a virtual first layer through a network cable 1311, and the network powered device 211 is further connected to a network powered device 221 within the virtual second layer in series through a network cable 1312, and the network powered device 221 is further serially connected to a network powered device 231 within the virtual third layer through a network cable 1313.

The communication ports 103 is connected to the network powered device 213 and network powered device 223 within two different virtual layers in a serial connection through network cables 1331 and 1332. The communication port 104 and communication port 106 are connected to the network powered device 214 and network powered device 216 within a respective single layer through network cables 1341 and 1361 respectively.

In the present embodiment, the network powered devices 211, 221, 231, 213, 223, 214 and 216 (physical devices) are preferably webcams that support a network power transmission function and have a serial connection function.

In some embodiments, the networked device configuration identifying device 10 provides multiple communication ports as many as up to 24 ports, and transmits a direct current (DC) electric power to the network powered devices 211, 221, 231, 213, 223, 214 and 216 through network cables 1311, 1312, 1313, 1331, 1332, 1341 and 1361 with a maximum length of 100 meters. Each communication ports are capable of connecting with with multiple physical devices as many as up 4 to 5 devices in a serial connection configuration. Each physical devices have a built-in dual port hub module and a network repeater module (a relay module), so to extensively connect with more physical devices in series subject to the constatin of the maximum bandwidth and rated power the networked device configuration identifying device 10 has.

In some embodiments, the MCU 121 is preferably an independent MCU separated and split from the system MCU included in the power over network device. Alternatively, the MCU 121 is integrated with the system MCU included in the power over network device or other functional chip or chip set such as a power management chip.

The MCU 121 included in the networked device configuration identifying device 10 is configured to switch on or switch off the switch components 111-114, so to indirectly acquire a right of control to the communication and power transmission function for each communication port 101-106 by controlling the switch components 111-114. When the MCU 121 switches on the switch components 111-114 to turn on the communication and power transmission function for the communication ports 101-106, the connected network powered devices 211, 221, 231, 213, 223, 214 and 216 receive the electric power supplied from the communication ports 101-106 through the network cables 1311, 1312, 1313, 1331, 1332, 1341 and 1361 and commence working and establishing a network connection accessing into the LAN. When the MCU 121 turns off the communication and power transmission function for the communication ports 101-106 by switching off the switch components 111-114, the connected network powered devices 211, 221, 231, 213, 223, 214 and 216 stop operating due to the loss of power supply, and cease the network connection accessing into the LAN.

The switch components 111-114 are preferably a mechanical relay or an metal oxide semiconductor (MOS) switch transistor including at least a PMOS transistor, a NMOS transistor or a combination thereof. For instance, in the present embodiment, the switch components 111-113 are preferably but not limited to a double pole double throw (DPDT) relay, as well as the switch component 114 is an MOS switch transistor. The relationship of control between the switch components 111-114 and the communication ports 101-106 is preferably a one-to-one relationship or a one-to-many relationship. For instance, for the switch components 111-113 based on the DPDT relay, each switch component 111-113 control the communication ports 101-103 respectively to switch between an opened-circuit state or a closed-circuit state, which is classified as a one-to-one control relationship. Alternatively, one single switch component 114 based on the MOS switch transistor is capable of controlling a total of three communication ports 104-106 to switch on or off, which is classified as a one-to-many control relationship.

The MCU 121 is embedded with multiple implementation steps of the networked device configuration identifying method, and is activated to execute a networked device configuration identifying operation, to automatically identify the networked device configuration information for a LAN formed with the networked device configuration identifying device 10 as the center node. The networked device configuration information preferably refers to information including but not limited to a deployment information, a setting information and an address information for a group of networked devices in the same LAN.

In the present embodiment, the networked device configuration information at least includes: information, such as, MAC address and IP address for all network powered devices 211, 221, 231, 213, 223, 214 and 216 serially connected to all the communication ports 101-106 and the sequence of serial connection of these physical devices serially connected to the respective communication ports.

According to the present invention, the networked device configuration identifying method at least includes multiple major steps of an initial all device address resolution step, a background device address resolution step, an interested device address resolution step, an interested powered device time tick resolution step, a device sequence of serial connection resolution step for an interested communication port, a all communication port cyclic scanning step, a local area network topology resolution step, etc.

In the initial all device address resolution step, firstly the MCU 121 sends a switching-on signal to render all the switch components 111-114 switched on to enable a communication and power transmission for all the communication ports 101-106, so that all the network powered devices 211, 221, 231, 213, 223, 214 and 216 are provided with the electric power and network connection through all the communication ports 101-106 and commence a booting process. The MCU 121 is pending and waiting for all the network powered devices 211, 221, 231, 213, 223, 214 and 216 to boot up.

During the booting process, the network powered devices 211, 221, 231, 213, 223, 214 and 216 execute a dynamic host configuration protocol (DHCP) for example, to look for an available server on the network and request an address allocation to legitimately obtain an IP address to access the Internet.

FIG. 2 is a schematic view demonstrating the initial all device address information obtained by implementing the networked device configuration identifying method according to the invention. After all the network powered devices 211, 221, 231, 213, 223, 214 and 216 boots up successfully, through all the switched-on communication ports 101-106, the MCU 121 executes a smart address resolution protocol for all the operating network powered devices 211, 221, 231, 213, 223, 214 and 216. The smart address resolution protocol sends a data packet to the server to inquire the IP addresses of all the physical devices in the LAN, and inquire the corresponding physical MAC addresses of these IP addresses to convert the IP addresses into MAC addresses. The smart address resolution protocol is preferably selected from one of an address resolution protocol (ARP) and a simple network management protocol (SNMP).

In the present embodiment, the smart address resolution protocol is preferably but not limited to the ARP. The MCU 121 executes the ARP to scan all the network powered devices 211, 221, 231, 213, 223, 214 and 216 under work through all the switched-on communication ports 101-106, and sends an ARP data packet to the server to obtain the IP addresses and MAC addresses of these physical devices, to identify the MAC addresses and IP addresses for all the network powered devices 211, 221, 231, 213, 223, 214 and 216 within the LAN. Meanwhile, a copy of initial all device address information including the MAC addresses and IP addresses for all the network powered devices 211, 221, 231, 213, 223, 214 and 216 under work connected to all the communication ports 101-106 in series is obtained, as shown in FIG. 2.

In the present embodiment, the Internet Address field 20 in the initial all device address information records the IP addresses for all the physical devices within the LAN, covering: 10.10.50.7, 10.10.50.10, 10.10.50.29, 10.10.50.109, 10.10.50.130 and 10.10.50.139. The Physical Address field 30 records the corresponding binary MAC addresses of all the IP addresses within the LAN, covering: ec-eb-b8-1e-bb-e3, 00-15-5d-c8-fa-2a, 24-5e-be-27-4a-76, 4c-44-5b-c9-a9-1e, 00-00-00-00-00-01, d8-5e-d3-40-3d-9e and 00-e0-4c-68-02-81.

In this stage, although the information including the MAC addresses and IP addresses for all the network powered devices 211, 221, 231, 213, 223, 214 and 216 is well obtained, for each individual communication ports 101-106 serially connected with these physical devices having the MAC addresses and IP addresses, the mapping relationship of these MAC addresses and IP addresses with respect to the physical devices and the information concerning the sequence of serial connection on each communication port are yet to obtain.

Next, the MCU 121 executes the background device address resolution step. By controlling the switch components 111-114, the MCU 121 switches off one of the communication ports 101-106 to act as the interested communication port. In the present embodiment, the MCU 121 sends a switch-off signal to render the switch component 111 switched off to cease the communication and power transmission via the communication port 101 and use the communication port 101 as the interested communication port. Now, as the communication port 101 is switched off, the network powered devices 211, 221 and 231 connected to the communication port 101 stop working due to the loss of power supply.

FIG. 3 is a schematic view demonstrating the background device address information obtained by implementing the networked device configuration identifying method according to the present invention. Next, through the switched-on communication ports 102-106, the MCU 121 executes the smart address resolution protocol to scan each physical device in operation, including the network powered devices 213, 223, 214 and 216 that are currently in operation, and resolves the MAC addresses and IP addresses for these physical devices. A copy of background device address information including the MAC addresses and IP addresses for all the network powered devices 213, 223, 214 and 216 (the background network powered devices) serially connected to communication ports 102-106 is obtained, as shown in FIG. 3.

In the present embodiment, the Internet Address field 20 in the background device address information records the IP addresses of all the physical devices connected to the communication ports 102-106 except the communication port 101, covering: 10.10.50.7, 10.10.50.10, 10.10.50.29 and 10.10.50.109, and the Physical Address field 30 records the binary MAC addresses corresponding to all the IP addresses in the LAN, covering: ec-eb-b8-1e-bb-e3, 00-15-5d-c8-fa-2a, 24-5e-be-27-4a-76 and 4c-44-5b-c9-a9-1e.

FIG. 4 is a schematic view demonstrating the interested device address information obtained by implementing the networked device configuration identifying method according to the present invention. Next, the MCU 121 executes the interested device address resolution step. After the initial all device address information and background device address information are obtained, the MCU 121 compares the initial all device address information with the background device address information, and then discovers that there are three groups of MAC addresses and IP addresses missing. These three groups of MAC addresses and IP addresses that are not included in the MAC addresses and IP addresses in the background device address information are the MAC addresses and IP addresses for the three network powered devices 211, 221 and 231 (the interested network powered device) serially connected to the communication port 101, and recorded as the interested device address information in association with the communication port 101.

In the present embodiment, the Internet Address field 20 in the interested device address information records the IP addresses for all the physical devices connected to the particular individual communication port 101, covering: 10.10.50.111, 10.10.50.130 and 10.10.50.139, and the Physical Address field 30 records all the binary MAC addresses corresponding to the IP address in the LAN, covering: 00-00-00-00-00-01, d8-5e-d3-40-3d-9e and 00-e0-4c-68-02-81.

In this stage, although the information including the MAC addresses and IP addresses for all the physical devices serially connected to this particular individual communication port 101, and the relationship of these MAC addresses and IP addresses being in association with the three network powered devices 211, 221 and 231 are obtained and known, the determined corresponding relationships of how these three groups of MAC addresses and IP addresses are corresponded to the three network powered devices 211, 221 and 231, and the sequence of serial connection of these three groups of MAC addresses and IP addresses serially connected to this particular individual communication port 101 are yet unknown.

Next, the MCU 121 executes the interested powered device time tick resolution step. The MCU 121 sends a switch-on signal to render the switch component 111 switched on to enable the communication and power transmission via the communication port 101. Now, the network powered devices 211, 221 and 231 re-receive electric power supply from the communication port 101 and reboot to operate online.

The MCU 121 is pending and waiting for all the network powered devices 211, 221 and 231 to go through the rebooting process. Everytime when each the network powered devices 211, 221, 231, 213, 223, 214 and 216 reboots up successfully, the real-time clock (RTC) module disposed inside these physical devices are instantly activated to count the time ticks since the rebooting of these particular physical devices. Each time tick has a uniform unit in centisecond.

After the network powered devices 211, 221 and 231 reboots up successfully, the MCU 121 resumes executing a smart network management protocol. The smart network management protocol sends an inquiry data packet to the network powered devices 211, 221 and 231 to inquire the accumulated time ticks in the RTC modules inside each network powered devices 211, 221 and 231. The smart network management protocol is preferably selected from one of an ARP and a SNMP protocol.

Figures 5, 6:
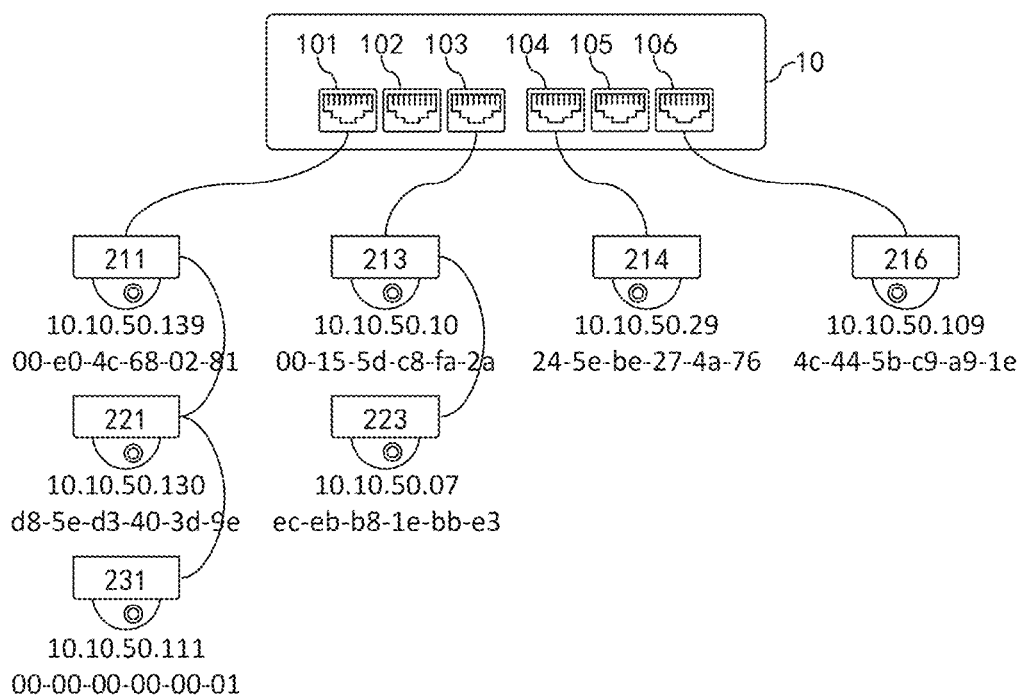
FIG. 5 is a schematic view demonstrating the time tick information obtained by implementing the networked device configuration identifying method according to the present invention.
FIG. 6 is a schematic diagram illustrating the topology of the local area network obtained by the networked device configuration identifying method according to the present invention.

FIG. 5 is a schematic view demonstrating the time tick information obtained by implementing the networked device configuration identifying method according to the present invention. In the present embodiment, the smart network management protocol is preferably the SNMP protocol. The MCU 121 executes the SNMP protocol, sends a time tick inquiry data packet out to each of the network powered devices 211, 221 and 231, and receives the time tick data packets returned back from each of the network powered devices 211, 221 and 231.

As showin FIG. 5, according to the time tick data packet returned from the IP address 10.10.50.139, the network powered device at IP address 10.10.50.139 recorded a time tick of 9250, which represents a total time of 01:32:50 has elapsed since the rebooting until the inquiry of the SNMP data packet. According to the time tick data packet returned from the IP address 10.10.50.130, the network powered device at IP address 10.10.50.130 recorded a time tick of 8296, which represents 01:22:96 has elapsed since the rebooting until the SNMP inquiry. According to the time tick data packet returned back from the IP address 10.10.50.111, the network powered device at IP address 10.10.50.111 recorded a time tick of 6805, which represents 01:08:05 has elapsed since the rebooting until the SNMP inquiry.

Next, the MCU 121 executes an interested communication port device sequence of serial connection resolution step. The MCU 121 compares the values of the time tick for each physical devices, and then resolves the sequence of serial connection of the physical devices connected the interested communication port.

In terms of the above feedback information, according to the high and low of the values of the time ticks, the MCU 121 is capable of determining that the network powered device at IP address 10.10.50.139 is the firstly rebooted device, the network powered device at IP address 10.10.50.130 is the secondly rebooted device, and the network powered device at IP address 10.10.50.111 is the thirdly rebooted device, which implied the information concerning the sequence of the serial connection among the network powered devices 211, 221 and 231. Therefore, the IP address 10.10.50.139 is assigned to the device serially connected to the communication port 101 in the first place, which is the network powered device 211 that is closest to the the communication port 101 in the serial connection, the IP address 10.10.50.130 is assigned to the device serially connected to the communication port 101 in the second place, which is the network powered device 221, and the IP address 10.10.50.111 is assigned to the device serially connected to the communication port 101 in the third place, which is the network powered device 231 that is farthest to the the communication port 101 in the serial connection.

By inquiring the time tick from the network powered devices 211, 221 and 231, the present invention resolves the sequence of serial connection among the network powered devices 211, 221 and 231 connected to the communication ports 101 is as follows: the firstly connected device in series is the network powered device 211, the secondly connected device in series is the network powered device 221 that is indirectly connected to the communication port 101 via the connection of the network powered device 211, and the thirdly connected device in series is the network powered device 231 that is indirectly connected to the communication port 101 via the connections of the network powered device 221 and the network powered device 211.

FIG. 6 is a schematic diagram illustrating the topology of the local area network obtained by the networked device configuration identifying method according to the present invention. Next, the MCU 121 executes the all communication port cyclic scanning step. The MCU 121 sequentially executes the above steps including steps from the background device address resolution step to the device sequence of serial connection resolution step for each remaining communication ports including the communication ports from 102 to 106 cyclically, to obtain the address information and sequence of serial connection for all the physical devices connected to each of the communication ports 102-106.

Because the communication ports 103 and 105 are connected with none of physical devices which are the idle communication ports, even though the MCU 121 selects the communication ports 103 and 105 as the interested communication ports and performs the scanning through the communication ports 103 and 105, none of addresses will be found after scanning. It represents the selected interested communication ports are connected with none of physical devices and are the idle communication ports.

Next, the MCU 121 executes the local area network topology resolution step. According to the obtained sequence of serial connection of each of the network powered devices connected to each communication port 101-106, the MCU 121 is configured to use the networked device configuration identifying device 10 as a center node to organize a tree-like connection structure and arrangements among the communication ports 101-106 and the network powered devices 211, 221, 231, 213, 223, 214 and 216, and labels the network powered devices 211, 221, 231, 213, 223, 214 and 216 with the identified dynamic IP addresses and determined MAC addresses, so as to create and output the network topology information for the local area network built up on the basis of the networked device configuration identifying device 10 as a center node, as shown in FIG. 6.

Lastly, through the hardware connection port disposed on the networked device configuration identifying device 10, or by a direct network transmission scheme, the MCU 121 outputs all the identified networked device configuration information.

Figure 7:
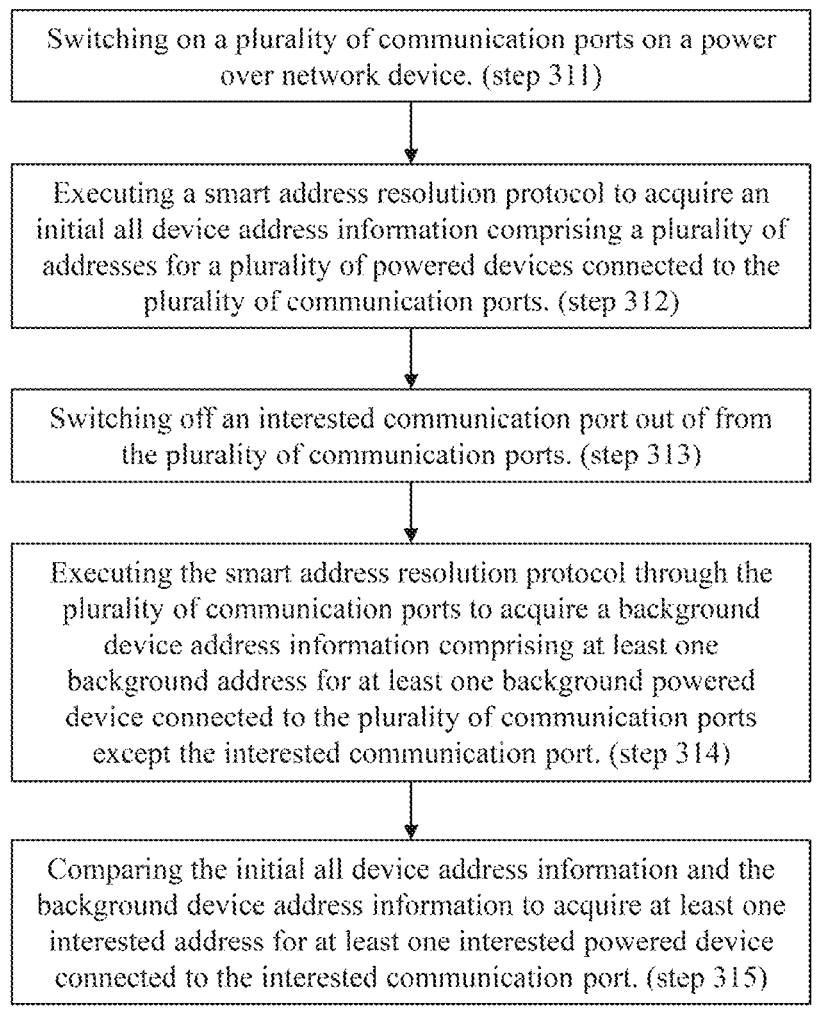
FIG. 7 is a flow chart showing the implementation steps for the device address detection method according to the present invention.

FIG. 7 is a flow chart showing the implementation steps for the device address detection method according to the present invention. In conclusion, the networked device configuration identifying method included in the present invention preferably includes a device address detection method and a device sequence of serial connection detection method. The networked device configuration identifying method 310 preferably includes but is not limited to steps executed by a microcontroller as follows: switching on a plurality of communication ports on a power over network device (step 311); executing a smart address resolution protocol to acquire an initial all device address information comprising a plurality of addresses for a plurality of powered devices connected to the plurality of communication ports (step 312); switching off an interested communication port out of from the plurality of communication ports (step 313); executing the smart address resolution protocol through the plurality of communication ports to acquire a background device address information comprising at least one background address for at least one background powered device connected to the plurality of communication ports except the interested communication port (step 314); and comparing the initial all device address information and the background device address information to acquire at least one interested address for at least one interested powered device connected to the interested communication port (step 315).

Figure 8:
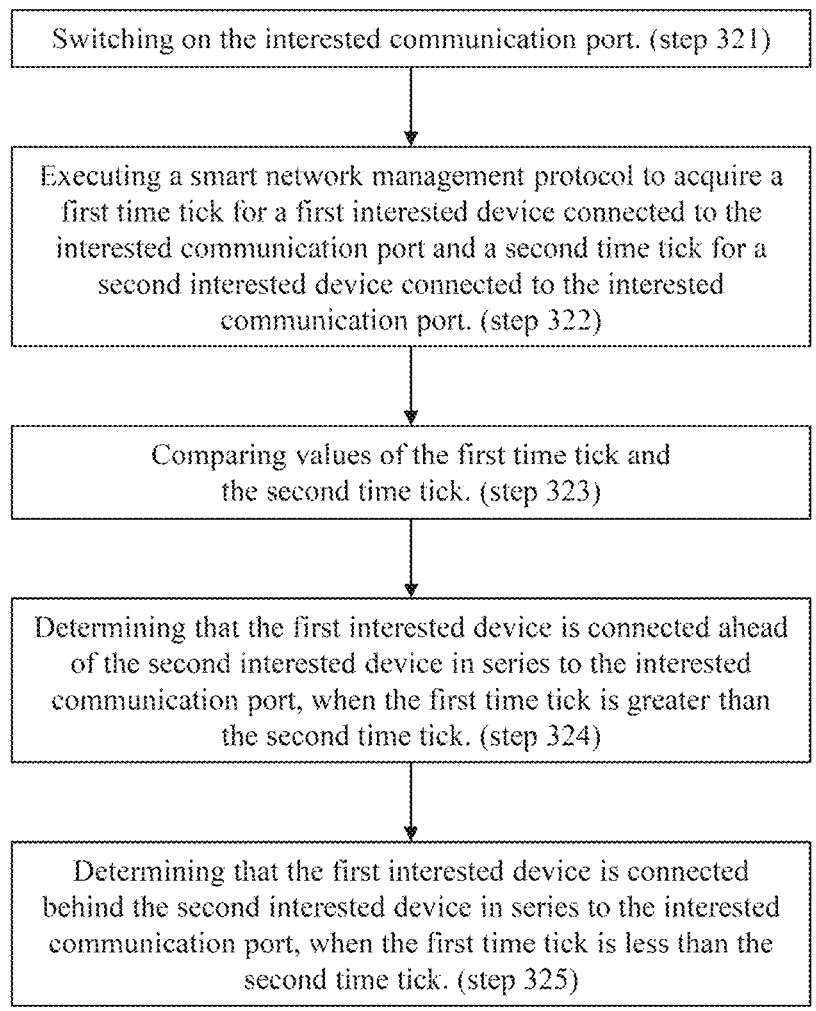
FIG. 8 is a flow chart showing the implementation steps for the device sequence of serial connection detection method according to the present invention.

FIG. 8 is a flow chart showing the implementation steps for the device sequence of serial connection detection method according to the present invention. The device sequence of serial connection detection method 320 included in the present invention preferably includes but is not limited to steps executed by a microcontroller as follows: switching on the interested communication port (step 321); executing a smart network management protocol to acquire a first time tick for a first interested device connected to the interested communication port and a second time tick for a second interested device connected to the interested communication port (step 322); comparing values of the first time tick and the second time tick (step 323); determining that the first interested device is connected ahead of the second interested device in series to the interested communication port, when the first time tick is greater than the second time tick (step 324); and determining that the first interested device is connected behind the second interested device in series to the interested communication port, when the first time tick is less than the second time tick (step 325).

Figure 9:
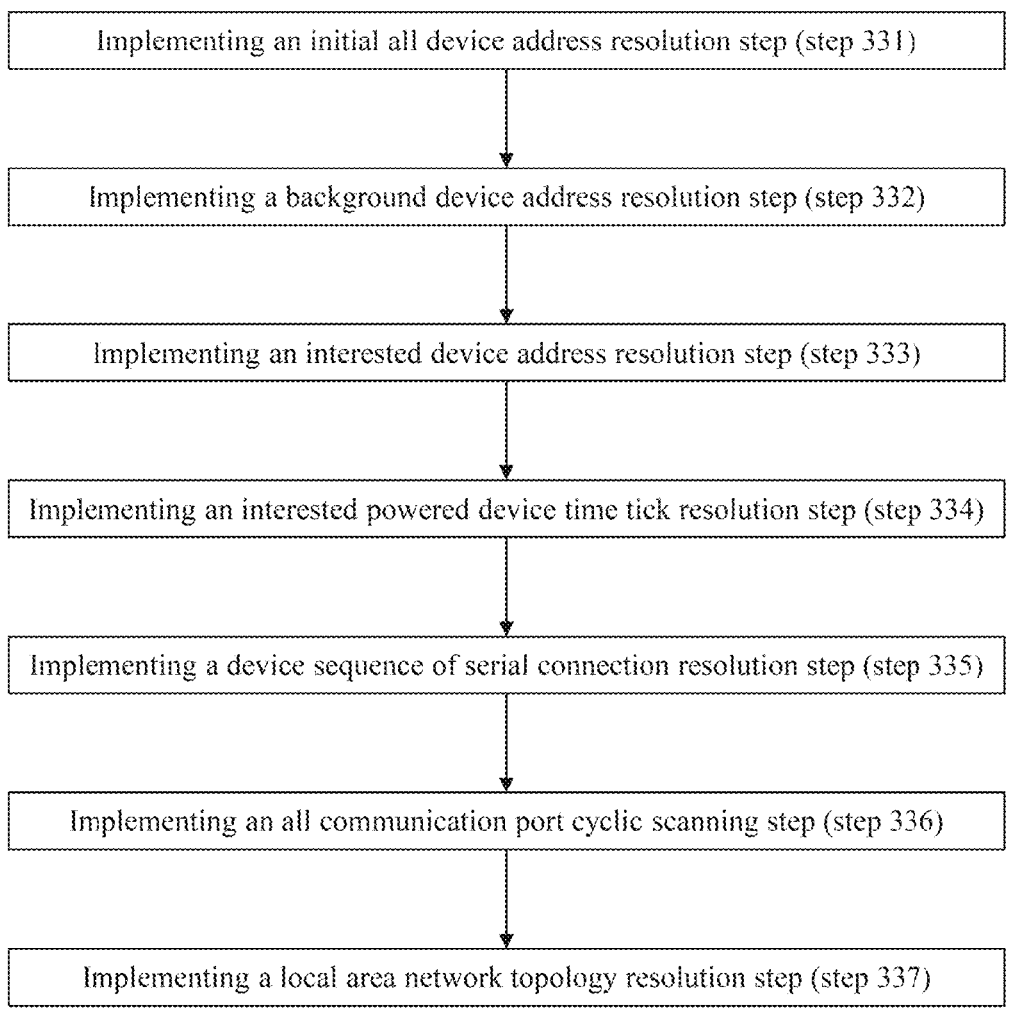
FIG. 9 is a flow chart showing the implementation steps for the networked device configuration identifying method according to the present invention.

FIG. 9 is a flow chart showing the implementation steps for the networked device configuration identifying method according to the present invention. To sum up, the networked device configuration identifying method 330 included in the present invention preferably includes but is not limited to steps executed by a microcontroller as follows.

Implementing an initial all device address resolution step (step 331), to acquire all the plurality of addresses for all the plurality of powered devices connected to the plurality of communication ports by executing the smart address resolution protocol through all the plurality of communication ports on the power over Ethernet device; and implementing a background device address resolution step (step 332), to switch off an interested communication port out of from all the plurality of communication ports, so to acquire all the at least one background addresses for all the at least one background powered device connected to the plurality of communication ports except the interested communication port by executing the smart address resolution protocol through all the plurality of communication ports.

Implementing an interested device address resolution step (step 333), to compare all the plurality of addresses for all the plurality of powered devices with all the at least one background addresses for all the at least one background powered device, to acquire all the at least one interested address for all the at least one interested powered device; and implementing an interested powered device time tick resolution step (step 334), to switch on the interested communication port, so to acquire at least one time tick for all the at least one interested powered device connected to the interested communication port after rebooting by executing a smart network management protocol through the interested communication port.

Implementing a device sequence of serial connection resolution step (step 335), to arrange all the at least one interested powered device connected to the interested communication port in series from the closest one closest to the interested communication port to the farthest one according to an order of from high to low of the values of the at least one time tick, so to acquire at least one sequence of serial connection on the interested communication port for all the at least one interested powered device; implementing an all communication port cyclic scanning step (step 336), to cyclically perform the background device address resolution step to the sequence of serial connection on the interested communication port for the interested powered device resolution step until all the plurality of communication ports are scanned, so to acquire all the at least one sequence of serial connection and all the plurality of addresses for all the plurality of powered devices connected to all the plurality of communication ports; and implementing a local area network topology resolution step (step 337), to organize a network topology and a configuration thereof in a tree structure among all the plurality of powered devices connected to all the plurality of communication ports and label the identified addresses in proximity to the corresponding powered device according to the acquired all the at least one sequence of serial connection for all the plurality of powered devices connected to all the plurality of communication ports based on the power over Ethernet device as a center node.

By adding an extra MCU in the PoE device to control the power source of each communication port, combined with the ARP as a preferred but not limited example, the present invention uses network addresses to identify the MAC addresses and corresponding IP addresses of the devices. When all the devices in the local area network are operating, the ARP is firstly used to scan all the devices in the local area network. Then, the PoE can switch on/off the power source of each communication port. An ARP scan is conducted between the on and off states of the power source. Through the elimination method, the address of each device connected to each communication port can be identified.

As all the devices have built-in RTC modules, when the PoE recovers power supply to each communication port, the device is restarted and the RTC is reset. Then, using a preferred embodiment including but not limited to the SNMP protocol, the time ticks after restarting of the devices can be displayed to show the starting sequence of each of the devices in the local area network.

The present invention can manage the state of the devices connected to the communication ports in the PoE. When a certain device fails, the corresponding IP address and MAC address on the failing device communication port can be quickly identified. This can greatly reduce the time spent in finding the failing device in the LAN, thus saving network maintenance time.

There are further embodiments provided as follows.

Embodiment 1: A networked device configuration identifying method, which includes steps of: switching on a plurality of communication ports on a power sourcing device; executing a smart address resolution protocol to acquire an initial all device address information including a plurality of addresses for a plurality of powered devices connected to the plurality of communication ports; switching off an interested communication port out of from the plurality of communication ports; executing the smart address resolution protocol through the plurality of communication ports to acquire a background device address information including at least one background address for at least one background powered device connected to the plurality of communication ports except the interested communication port; and comparing the initial all device address information and the background device address information to acquire at least one interested address for at least one interested powered device connected to the interested communication port.

Embodiment 2: The networked device configuration identifying method as described in Embodiment 1 further includes one of: switching on the interested communication port; executing a smart network management protocol to acquire a first time tick for a first interested device connected to the interested communication port and a second time tick for a second interested device connected to the interested communication port; comparing values of the first time tick and the second time tick; determining that the first interested device is connected ahead of the second interested device in series to the interested communication port, when the first time tick is greater than the second time tick; and determining that the first interested device is connected behind the second interested device in series to the interested communication port, when the first time tick is less than the second time tick.

Embodiment 3: The networked device configuration identifying method as described in Embodiment 1 further includes one of: implementing an initial all device address resolution step, to acquire all the plurality of addresses for all the plurality of powered devices connected to the plurality of communication ports by executing the smart address resolution protocol through all the plurality of communication ports on the power sourcing device; implementing a background device address resolution step, to switch off an interested communication port out of from all the plurality of communication ports, so to acquire all the at least one background addresses for all the at least one background powered device connected to the plurality of communication ports except the interested communication port by executing the smart address resolution protocol through all the plurality of communication ports; implementing an interested device address resolution step, to compare all the plurality of addresses for all the plurality of powered devices with all the at least one background addresses for all the at least one background powered device, to acquire all the at least one interested address for all the at least one interested powered device; implementing an interested powered device time tick resolution step, to switch on the interested communication port, so to acquire at least one time tick for all the at least one interested powered device connected to the interested communication port after rebooting by executing a smart network management protocol through the interested communication port; implementing a device sequence of serial connection resolution step, to arrange all the at least one interested powered device connected to the interested communication port in series from the closest one closest to the interested communication port to the farthest one according to an order of from high to low of the values of the at least one time tick, so to acquire at least one sequence of serial connection on the interested communication port for all the at least one interested powered device; implementing an all communication port cyclic scanning step, to cyclically perform the background device address resolution step to the sequence of serial connection on the interested communication port for the interested powered device resolution step until all the plurality of communication ports are scanned, so to acquire all the at least one sequence of serial connection and all the plurality of addresses for all the plurality of powered devices connected to all the plurality of communication ports; and implementing a local area network topology resolution step, to organize a network topology and a configuration thereof in a tree structure among all the plurality of powered devices connected to all the plurality of communication ports and label the identified addresses in proximity to the corresponding powered device according to the acquired all the at least one sequence of serial connection for all the plurality of powered devices connected to all the plurality of communication ports based on the power sourcing device as a center node.

Embodiment 4: The networked device configuration identifying method as described in Embodiment 1, the plurality of powered devices include the at least one background powered device and the at least one interested powered device.

Embodiment 5: The networked device configuration identifying method as described in Embodiment 1, the smart address resolution protocol is selected from one of an address resolution protocol and a simple network management protocol, and the smart network management protocol is selected from one of a simple network management protocol and an address resolution protocol.

Embodiment 6: The networked device configuration identifying method as described in Embodiment 1, the plurality of addresses are selected from one of an internet protocol address (IP address) and a media access control address (MAC address).

Embodiment 7: A networked device configuration identifying device which includes: a plurality of communication ports and a microcontroller, in which the microcontroller is configured to execute processes as follows: switching on a plurality of communication ports on a power sourcing device; executing a smart address resolution protocol to acquire an initial all device address information including a plurality of addresses for a plurality of powered devices connected to the plurality of communication ports; switching off an interested communication port out of from the plurality of communication ports; executing the smart address resolution protocol through the plurality of communication ports to acquire a background device address information including at least one background address for at least one background powered device connected to the plurality of communication ports except the interested communication port; and comparing the initial all device address information and the background device address information to acquire at least one interested address for at least one interested powered device connected to the interested communication port.

Embodiment 8: The networked device configuration identifying device as described in Embodiment 7 further includes one of: a switch component configured to switch on or off a communication and power transmission for at least one communication port out of from the plurality of communication ports; and the microcontroller configured to acquire a right of control to switch on or off the communication and power transmission for the plurality of communication ports by controlling the switch component.

Embodiment 9: The networked device configuration identifying device as described in Embodiment 7, the networked device configuration identifying device is selected from one of a power over Ethernet (PoE) device, a PoE hub, a PoE switch, a PoE router, a PoE bridge, a PoE gateway, a PoE brouter, a PoE repeater, a PoE relay and a PoE network address translation (NAT) device.

Embodiment 10: The networked device configuration identifying device as described in Embodiment 8, the switch component is selected from one of a mechanical relay and a switch transistor.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A networked device configuration identifying method, comprising:
   switching on a plurality of communication ports on a power sourcing device;
   executing a smart address resolution protocol to acquire an initial all device address information comprising a plurality of addresses for a plurality of powered devices connected to the plurality of communication ports;
   switching off an interested communication port out of from the plurality of communication ports;
   executing the smart address resolution protocol through the plurality of communication ports to acquire a background device address information comprising at least one background address for at least one background powered device connected to the plurality of communication ports except the interested communication port; and
   comparing the initial all device address information and the background device address information to acquire at least one interested address for at least one interested powered device connected to the interested communication port.

2. The networked device configuration identifying method as claimed in claim 1, further comprising one of:
   switching on the interested communication port;
   executing a smart network management protocol to acquire a first time tick for a first interested device connected to the interested communication port and a second time tick for a second interested device connected to the interested communication port;
   comparing values of the first time tick and the second time tick;
   determining that the first interested device is connected ahead of the second interested device in series to the interested communication port, when the first time tick is greater than the second time tick; and
   determining that the first interested device is connected behind the second interested device in series to the interested communication port, when the first time tick is less than the second time tick.

3. The networked device configuration identifying method as claimed in claim 1, further comprising one of:
   implementing an initial all device address resolution step, to acquire all the plurality of addresses for all the plurality of powered devices connected to the plurality of communication ports by executing the smart address resolution protocol through all the plurality of communication ports on the power sourcing device;
   implementing a background device address resolution step, to switch off an interested communication port out of from all the plurality of communication ports, so to acquire all the at least one background addresses for all the at least one background powered device connected to the plurality of communication ports except the interested communication port by executing the smart address resolution protocol through all the plurality of communication ports;
   implementing an interested device address resolution step, to compare all the plurality of addresses for all the plurality of powered devices with all the at least one background addresses for all the at least one background powered device, to acquire all the at least one interested address for all the at least one interested powered device;
   implementing an interested powered device time tick resolution step, to switch on the interested communication port, so to acquire at least one time tick for all the at least one interested powered device connected to the interested communication port after rebooting by executing a smart network management protocol through the interested communication port;
   implementing a device sequence of serial connection resolution step, to arrange all the at least one interested powered device connected to the interested communication port in series from the closest one closest to the interested communication port to the farthest one according to an order of from high to low of the values of the at least one time tick, so to acquire at least one sequence of serial connection on the interested communication port for all the at least one interested powered device;
   implementing an all communication port cyclic scanning step, to cyclically perform the background device address resolution step to the sequence of serial connection on the interested communication port for the interested powered device resolution step until all the plurality of communication ports are scanned, so to acquire all the at least one sequence of serial connection and all the plurality of addresses for all the plurality of powered devices connected to all the plurality of communication ports; and
   implementing a local area network topology resolution step, to organize a network topology and a configuration thereof in a tree structure among all the plurality of powered devices connected to all the plurality of communication ports and label the identified addresses in proximity to the corresponding powered device according to the acquired all the at least one sequence of serial connection for all the plurality of powered devices connected to all the plurality of communication ports based on the power sourcing device as a center node.

4. The networked device configuration identifying method as claimed in claim 1, wherein the plurality of powered devices comprise the at least one background powered device and the at least one interested powered device.

5. The networked device configuration identifying method as claimed in claim 1, wherein the smart address resolution protocol is selected from one of an address resolution protocol and a simple network management protocol, and the smart network management protocol is selected from one of a simple network management protocol and an address resolution protocol.

6. The networked device configuration identifying method as claimed in claim 1, wherein the plurality of addresses are selected from one of an internet protocol address (IP address) and a media access control address (MAC address).

7. A networked device configuration identifying device, comprising:

a plurality of communication ports and a microcontroller, in which the microcontroller is configured to execute processes as follows:

switching on a plurality of communication ports on a power sourcing device;

executing a smart address resolution protocol to acquire an initial all device address information comprising a plurality of addresses for a plurality of powered devices connected to the plurality of communication ports;

switching off an interested communication port out of from the plurality of communication ports;

executing the smart address resolution protocol through the plurality of communication ports to acquire a background device address information comprising at least one background address for at least one background powered device connected to the plurality of communication ports except the interested communication port; and comparing the initial all device address information and the background device address information to acquire at least one interested address for at least one interested powered device connected to the interested communication port.

8. The networked device configuration identifying device as claimed in claim 7, further comprising one of:

a switch component configured to switch on or off a communication and power transmission for at least one communication port out of from the plurality of communication ports; and the microcontroller configured to acquire a right of control to switch on or off the communication and power transmission for the plurality of communication ports by controlling the switch component.

9. The networked device configuration identifying device as claimed in claim 7, wherein the networked device configuration identifying device is selected from one of a power over Ethernet (PoE) device, a PoE hub, a PoE switch, a PoE router, a PoE bridge, a PoE gateway, a PoE brouter, a PoE repeater, a PoE relay and a PoE network address translation (NAT) device.

10. The networked device configuration identifying device as claimed in claim 8, wherein the switch component is selected from one of a mechanical relay and a switch transistor.

* * * * *